United States Patent

[11] 3,581,627

[72] Inventor Sergio Campanini
 Lincolnwood
[21] Appl. No. 842,253
[22] Filed July 16, 1969
[45] Patented June 1, 1971
[73] Assignee Berg Mfg. & Sales Co.
 Des Planes,

[54] AIR AND SPRING BRAKE STRUCTURE
 2 Claims, 3 Drawing Figs.
[52] U.S. Cl. .................................................. 92/63,
 91/412, 92/64D.O)
[51] Int. Cl. .................................................. F01b 7/00
[50] Field of Search .......................................... 92/63, 64,
 65, 130; 188/170; 91/412

[56] References Cited
 UNITED STATES PATENTS
1,958,356 5/1934 Webb ............................ 188/170
2,118,130 5/1938 Aikman ......................... 91/412X
2,514,747 7/1950 Daniels .......................... 91/412X
2,768,503 10/1956 Snyder ........................... 92/63X
3,020,094 2/1962 Murty et al. .................... 303/9
3,406,609 10/1968 Cox ............................... 92/64X
3,508,470 4/1970 Swander et al. ................ 92/63

Primary Examiner—Martin P. Schwadron
Assistant Examiner—Leslie J. Payne
Attorney—Parker, Carter and Markey ABSTRACT: An air and spring brake chamber including means permitting transfer of air pressure from the service chamber to the emergency chamber to resist the action of the spring in the emergency chamber and simultaneously to urge the service chamber elements toward brakes-on position, said means preventing a compounding of service air and spring forces toward brakes-on position.

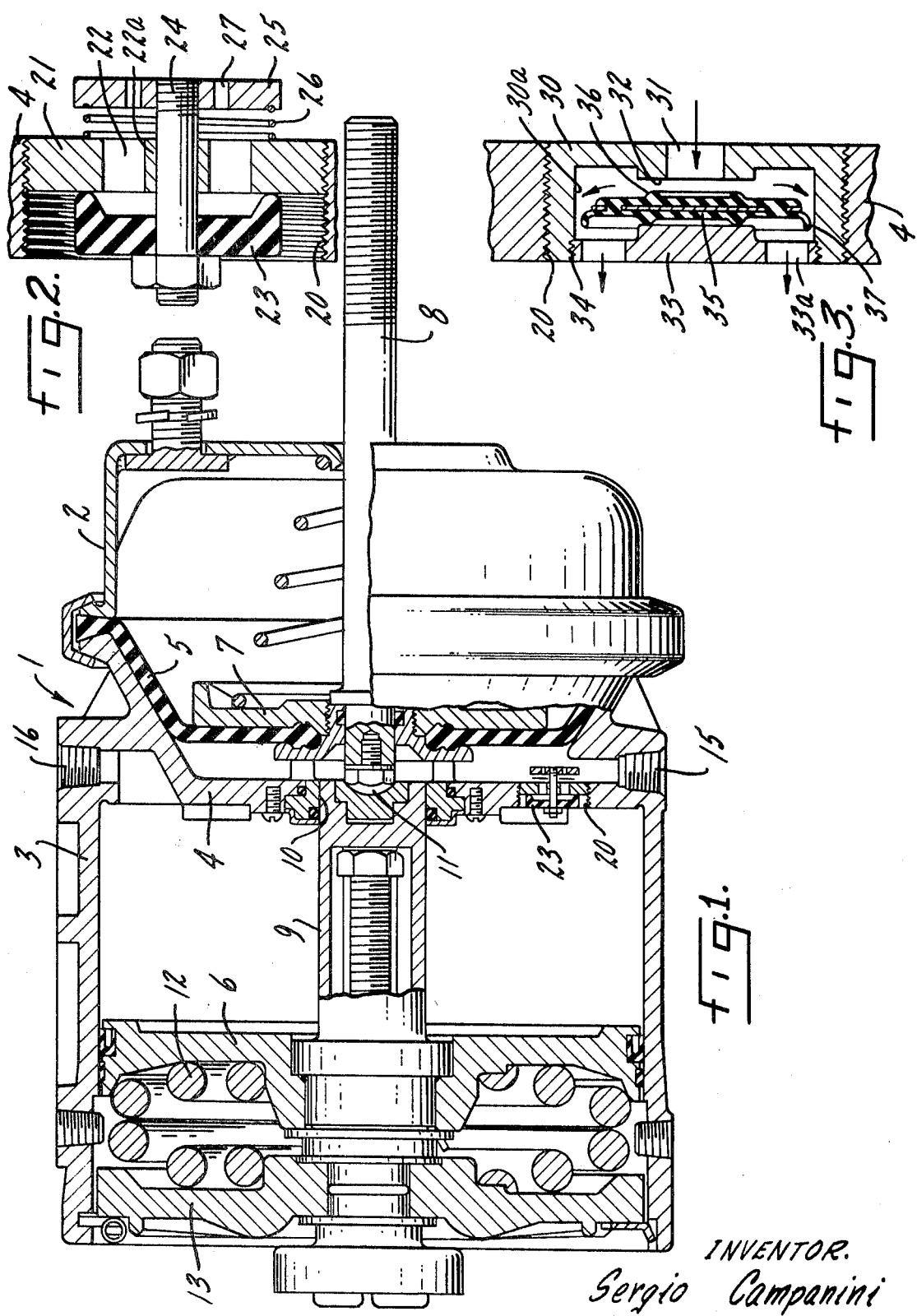

AIR AND SPRING BRAKE STRUCTURE

SUMMARY OF THE INVENTION

In an air and spring brake structure having a service chamber, a movable wall therein movable in response to service air pressure supplied thereto to move toward brakes-on position, an emergency chamber including a movable wall, spring means positioned to urge said last-named movable wall toward brakes-on position, said second movable wall being urged away from brakes-on position by air pressure supplied thereto, the improvement comprising a one-way pressure supply element positioned to permit passage of fluid pressure from said service chamber to said emergency chamber and to preclude passage of air in the opposite direction, one form of the invention including spring means effective to control the limitation of compounded air and spring forces exerted in said brakes-on direction.

This invention relates to vehicle braking systems, and particularly to air and spring brake structures usable in the application of vehicle brakes.

One purpose of the invention is to provide an air and spring brake structure including means effective to control compounding of air and spring forces in the operation thereof.

Another purpose is to provide an air and spring brake structure having means effective to preclude compounding of air and spring forces in the operation thereof.

Another purpose is to provide an air and spring brake structure having means effective to control the simultaneous application of air and spring forces in the operation thereof, which means shall be of maximum simplicity and economy in manufacture.

Other purposes may appear from time to time during the course of the specification and claims.

BRIEF DESCRIPTION OF THE DRAWINGS

The invention is illustrated more or less diagrammatically in the accompanying drawings wherein:

FIG. 1 is a side elevation with parts in cross section;

FIG. 2 is a detail view on an enlarged scale; and

FIG. 3 is a detail view of a variant form of the invention on the scale of FIG. 2.

Like parts are indicated by like numerals throughout the specification and drawings.

DESCRIPTION OF THE PREFERRED EMBODIMENT

Referring now to the drawings, and particularly to FIG. 1, the numeral 1 generally designates a housing. The housing 1 includes a service chamber 2 and an emergency chamber 3, the chambers 2,3 being divided by an intermediate wall 4. A first movable wall, taking the form of diaphragm 5, divides service chamber 2. A second movable wall, shown as the piston 6, divides emergency chamber 3.

A plate 7 and brake-actuating rod 8 are movable with diaphragm 5. Piston 6 carries extension 9 for movement through sealed aperture 10 in wall 4 and for contact with rod 8, as indicated at 11. A spring 12 engages a rear plate 13 of emergency chamber 3 and the opposed surface of piston 6 to urge piston 6, extension 9 and rod 8 toward brakes-on position.

An air or fluid pressure inlet 15 is positioned in housing 1 for delivery of fluid pressure to service chamber 2 on the side of diaphragm 5 opposite that engaged by plate 7 to urge the diaphragm 5 toward brakes-on position. A second air or fluid pressure entry 16 is positioned in housing 1 for delivery of fluid pressure to emergency chamber 3 on the side of piston 6 opposite that engaged by spring 12 to urge the piston 6 and extension 9 away from brakes-on position.

Formed in wall 4 is a threaded aperture 20. A fitting plate 21 is threadably engaged in the aperture 20 and has the central aperture or passage 22 therein for communication of the air pressure area of service chamber 2 with the air pressure area of emergency chamber 3 through the areas between the webs (not shown) supporting a boss 22a. A check valve element 23 engages the surface of plate 21 within emergency chamber 3 and the valve stem 24 secured to valve member 23 extends through boss 22a for connection with abutment plate 25. A spring 26 is shown as engaging the surface of plate 21 within the air pressure area of service chamber 2 and the opposed surface of plate 25. Axially paralleling, circumferentially spaced apertures 27 are formed in abutment plate 25, in alignment with passage or aperture 22.

Referring now to FIG. 3, a fitting 30 is threaded in aperture 20. The fitting 30 has an axial passage 31 with internal valve seat 32 surrounding the inner end thereof. Valve element retainer plate 33 is threadably engaged as at 34 in the opposite open end of fitting 30. A valve element 35 includes a circular valve ridge 36 positioned for seating on seat 32 and a peripheral skirt portion 37 positioned for contact with the inner circumferential wall 30a of fitting 30 in response to air pressure moving toward passage 31. A plurality of circumferentially spaced apertures 33a are formed in retainer plate 33 for movement of fluid pressure from passage 31 about the skirt 37 and through passages or apertures 33a.

The use and operation of the invention are as follows:

Air pressure is supplied at inlet 16, in known manner, to urge piston 16 and extension 9 into the position shown in FIG. 1 and compressing spring 12. In response to operation of the vehicle brake pedal (not shown), air pressure is supplied, as desired, through inlet 15 to move the diaphragm 5, plate 7 and brake-actuating rod 8 toward brakes-on direction, or to the right as the parts are shown in the drawings. As the brake pedal is released, air pressure is exhausted from the service chamber and the diaphragm 5, plate 7 and rod 8 return to the brakes-off position shown in FIG. 1.

The valve member of the invention is closed by an excess of pressure in the emergency chamber over that in the service chamber and is opened by an excess of pressure in the service chamber over that in the emergency chamber. Hence the normal excess of pressure in the emergency chamber urges valve member 23 on its seat against the inner surface of plate 21 and similarly urges valve ridge 36 on its seat 32 and skirt 37 against the circumferential wall 30a of fitting 30 in the form of FIG. 2. Thus the valve member of the invention has no affect upon the normal operation of the brake actuator of the invention.

Should air pressure be absent for any reason in the emergency chamber 3, the spring 12 will act to move piston 6, extension 9 and rod 8 in brakes-on position. Should air pressure thereafter be delivered at inlet 15, a compounding of the force of spring 12 and said delivered air pressure acts upon the rod 8, slack adjuster (not shown) and brake elements (not shown) connected therewith. The valve of the invention is effective to preclude such compounding of forces since the air pressure thus delivered at inlet 15 will open the valve member of the invention and said air pressure will act equally in opposite directions against the diaphragm 5 and piston 6. To the extent therefore, that such fluid pressure would urge diaphragm 5 and rod 8 toward brakes-on direction, it would at the same time urge piston 6 and extension 9 toward brakes-off direction. A spring of predetermined force, such as spring 26 for example, may be positioned for action with the valve member of the invention to permit a limited compounding of such forces when desired. In the form of FIGS. 1 and 2, the air pressure delivered at inlet 15 when emergency chamber 3 is devoid of air pressure is delivered through circumferentially spaced apertures 27 and axial opening 22 in plate 21 to the emergency chamber 3. In the form of FIG. 3, said air pressure is delivered through axial passage 31, about skirt 37 and through circumferentially spaced openings 33a in retainer plate 33.

It will be understood that the one-way check valve function of the invention may be accomplished in a variety of manners, two such valve structures being illustrated herein. A one-way-type seal for extension 9, for example, may be supplied without departing from the nature and scope of the invention.

I claim:

1. A brake actuator, including a brake-actuating rod, a service chamber having a first movable wall engaging said rod and operable in response to delivery of fluid pressure thereto to move said rod toward brakes-on position, an emergency chamber having a spring therein, and a second movable wall engaging said rod and operable in response to the action of said spring to move said rod toward brakes-on direction, said second movable wall being movable toward brakes-off direction in response to fluid pressure delivered to said emergency chamber, and means precluding simultaneous application of fluid pressure and the action of said spring on said rod, said means including a valving means responsive to an excess of fluid pressure in said service chamber over the fluid pressure in said emergency chamber to transfer fluid pressure from said service to said emergency chamber.

2. The structure of claim 1 wherein said valving means includes a spring urging said valving means toward closed position in the absence of an excess of service pressure over emergency pressure above a predetermined level.